(12) United States Patent
Nuber

(10) Patent No.: US 11,488,330 B2
(45) Date of Patent: Nov. 1, 2022

(54) BOUNDARY MAPS FOR VIRTUAL REALITY SYSTEMS

(71) Applicant: Hewlett-Packard Development Company, L.P., Spring, TX (US)

(72) Inventor: Nathan Barr Nuber, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 45 days.

(21) Appl. No.: 17/045,774

(22) PCT Filed: Jun. 1, 2018

(86) PCT No.: PCT/US2018/035585
§ 371 (c)(1),
(2) Date: Oct. 7, 2020

(87) PCT Pub. No.: WO2019/231463
PCT Pub. Date: Dec. 5, 2019

(65) Prior Publication Data
US 2021/0158576 A1    May 27, 2021

(51) Int. Cl.
*G06T 11/00* (2006.01)
*A63F 13/53* (2014.01)
*G06F 3/01* (2006.01)
*H04L 67/131* (2022.01)
*H04L 67/50* (2022.01)

(52) U.S. Cl.
CPC .............. *G06T 11/00* (2013.01); *A63F 13/53* (2014.09); *G06F 3/011* (2013.01); *H04L 67/131* (2022.05); *H04L 67/535* (2022.05); *A63F 2300/8082* (2013.01); *G06T 2200/16* (2013.01)

(58) Field of Classification Search
CPC ...... G06T 11/00; G06T 2200/16; A63F 13/53; A63F 2300/8082; G06F 3/011; H04L 67/22; H04L 67/38
USPC ......................................................... 345/441
See application file for complete search history.

(56) References Cited

U.S. PATENT DOCUMENTS

| 8,988,464 | B2 | 3/2015 | Kim et al. |
| 9,940,751 | B1 | 4/2018 | Wagner |
| 10,809,066 | B2 * | 10/2020 | Colburn ................. G06T 17/10 |
| 10,832,484 | B1 * | 11/2020 | Silverstein ............ G06F 3/0346 |

(Continued)

FOREIGN PATENT DOCUMENTS

| GB | 2524269 | 9/2015 |
| WO | WO-2017180990 | 10/2017 |

*Primary Examiner* — Jin Ge
(74) *Attorney, Agent, or Firm* — Tong Rea Bentley & Kim

(57) ABSTRACT

In example implementations, a server is provided. The server incudes a communication interface, a memory, and a processor communicatively coupled to the communication interface and the memory. The communication interface is to establish a communication session with virtual reality (VR) system to receive room identification information. The memory is to store a plurality of VR boundary maps for a plurality of different rooms. The processor is to compare the room identification information to the plurality of different rooms stored in the memory to identify a room of the plurality of different rooms, identify a VR boundary map from the plurality of VR boundary maps associated with the room, and transmit the VR boundary map to the VR system via the communication session.

12 Claims, 5 Drawing Sheets

(56) References Cited

U.S. PATENT DOCUMENTS

| | | |
|---|---|---|
| 2004/0104935 A1 | 6/2004 | Williamson et al. |
| 2009/0202114 A1 | 8/2009 | Morin et al. |
| 2011/0298824 A1 | 12/2011 | Lee et al. |
| 2012/0194516 A1* | 8/2012 | Newcombe .............. G06T 17/00 345/420 |
| 2013/0226451 A1* | 8/2013 | O'Neill ................ H04W 4/029 701/450 |
| 2015/0002507 A1* | 1/2015 | Ambrus ................ G06T 19/00 345/419 |
| 2015/0279081 A1 | 10/2015 | Monk et al. |
| 2016/0026253 A1 | 1/2016 | Bradski et al. |
| 2016/0055674 A1* | 2/2016 | Mullins ................ G02B 27/017 345/633 |
| 2016/0124502 A1* | 5/2016 | Sawyer .................. G06F 3/011 345/633 |
| 2016/0335917 A1* | 11/2016 | Lydecker ............. G09B 21/007 |
| 2017/0103574 A1* | 4/2017 | Faaborg ............. G02B 27/0172 |
| 2017/0287301 A1 | 10/2017 | Taylor et al. |
| 2018/0060333 A1 | 3/2018 | Bosch et al. |

* cited by examiner

BOUNDARY MAPS FOR VIRTUAL REALITY SYSTEMS

BACKGROUND

Virtual reality (VR) systems are used for a variety of different applications. The VR systems can be used for entertainment applications, such as video games. The VR systems can be used for educational purposes, such as training simulations. The VR systems can also be used for enterprise applications, such as providing tours, presentations, and the like.

The VR systems may include a computing system and a head mounted display (HMD). A user may wear the HMD and interact with the artificial environment generated by the computing system by viewing the artificial environment through the display in the HMD.

DETAILED DESCRIPTION

Examples described herein provide a system, apparatus, and method for generating and sharing virtual reality (VR) boundary maps. As discussed above, VR systems can be used for a variety of applications. In some applications, the VR systems may divide a physical room into different virtual regions. The different virtual regions may be referred to as a VR boundary map of the physical room. For example, the VR boundary map may display virtual walls in the display of a user's HMD to prevent the user from running into a physical wall or the virtual space of an adjacent or nearby user.

Currently, when parameters change in a given room, the VR boundary map may be changed. However, the VR boundary map is changed manually. For example, to put a VR boundary map on five different VR systems, an information technology (IT) technician may manually re-scan a room using each of the five VR systems individually, resulting in a great deal of repetition.

Examples herein provide a system that allows a VR boundary room to be mapped a single time. The VR boundary map for different rooms may be stored in a centrally located server. When a VR system enters a room, the VR system may send room identification information to the server and then receive the VR boundary map for the room in response.

In some examples, the server may have different VR boundary maps for a single room. The different VR boundary maps may be based on a particular application or a number of people that are in the room. As people leave or enter the room, the server may automatically send updated VR boundary maps to the VR systems of the users in the room. The HMD may display the updated VR boundary maps.

As a result, the present disclosure provides an automated and efficient method for generating and sharing VR boundary maps. In addition, as parameters in a room change, the VR boundary maps may be automatically updated by a server, rather than requiring an IT technician to manually re-scan the room or manually re-program the VR boundary maps.

Figure 1:
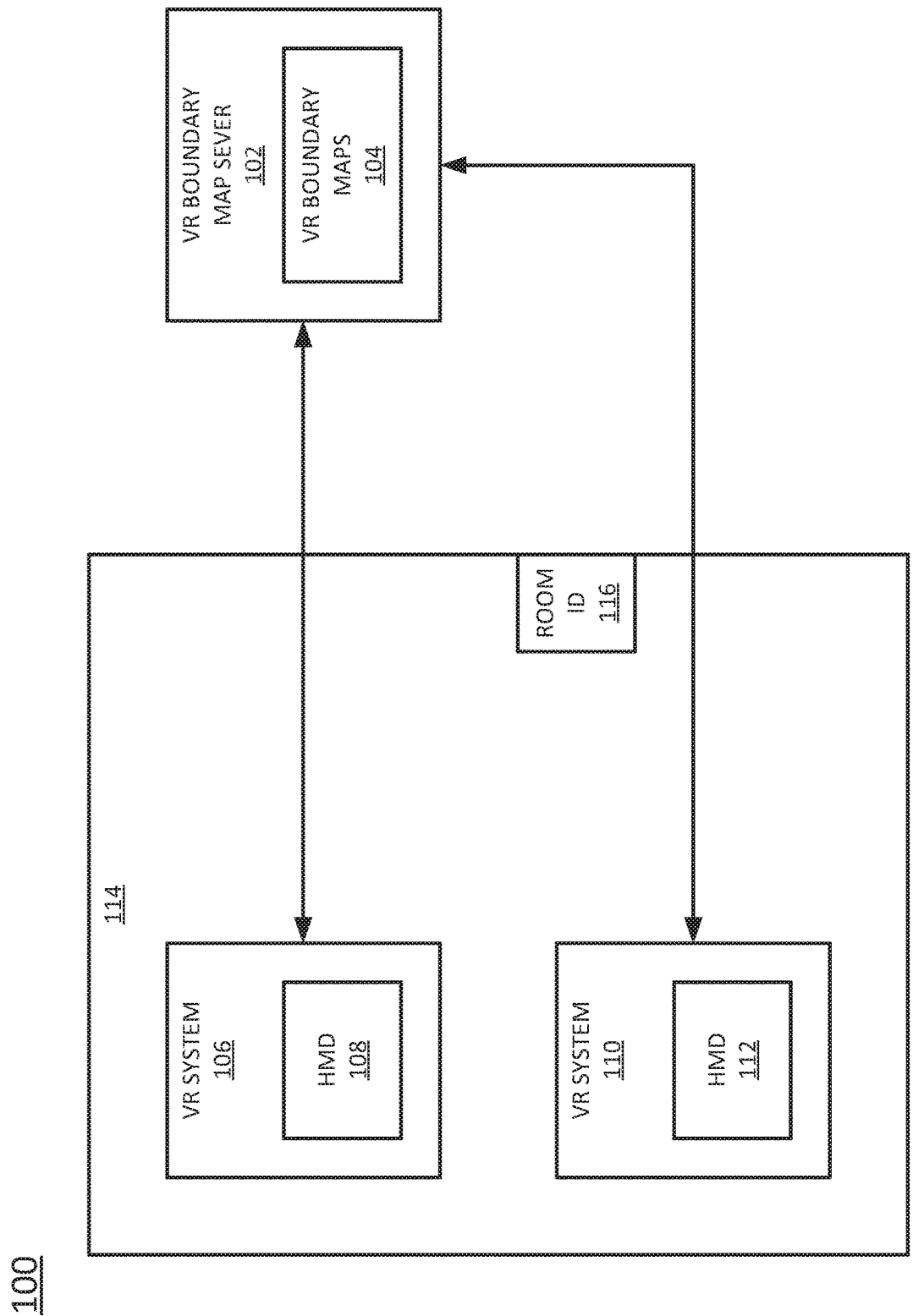
FIG. 1 is a block diagram of an example virtual reality boundary generation and sharing system of the present disclosure.

FIG. 1 illustrates a block diagram of a system 100 of the present disclosure. In one example, the system 100 may include a VR boundary map server 102 (also referred to as the server 102), a VR system 106, and a VR system 110. Although a single VR boundary map server 102 is illustrated in FIG. 1, it should be noted that any number of servers 102 may be deployed. Although two VR systems 106 and 110 are illustrated in FIG. 1, it should be noted that any number of VR systems may be deployed.

In one example, the VR system 106 may include a head mounted display (HMD) 108. The VR system 110 may include an HMD 112. The VR systems 106 and 110 may be used to interact within a VR space displayed by the respective HMDs 108 and 112 in a location or a room 114. The location 114 may be a room within a building.

In one example, the VR boundary server 102 may include VR boundary maps 104 that are used by the VR systems 106 and 110 to display VR boundary maps for the room 114 in the respective HMDs 108 and 112. Thus, a user of a respective VR system 106 or 110 may avoid running into structures or other users within the location 114 when interacting with the VR space displayed in the respective HMDs 108 or 112. In other words, the VR boundary map may be a virtual wall that is displayed in the respective HMD 108 or 112. The virtual walls may prevent users from moving into the space of another user, moving into an object or structure to prevent injury, and the like. Said another way, the location 114 may not have any walls inside the actual room, but the VR boundary map may display dividing walls or images of boundaries in the HMD 108 or 112.

In one example, the VR boundary maps 104 may include different boundary maps for different locations, different applications, or a different number of VR systems within the same location, as discussed in further details below. Based on the location 114, a number of VR systems in the location 114, and a requested application, the VR boundary map server 102 may transmit the correct VR boundary map from the VR boundary maps 104 to the respective VR systems 106 and/or 110.

In one example, the VR system 106 may be used to create the VR boundary map associated with the location 114. For example, the HMD 108 may include a camera that may capture images of the location 114. The images of the location 114 may be used to create a fingerprint of the location 114. Boundary maps may be initially generated by the VR system 106 for different applications and different numbers of users in the location 114.

For example, a boundary map may be designed for a single VR system in the location 114. The boundary map may limit the single VR system to a particular area within the location 114.

Another boundary map may be designed for two VR systems in the location 114 for a VR object viewing application. The VR boundary map may divide the location 114 in two separate areas, one for each VR system. The division may be lengthwise, widthwise, or any other desired division of the location 114.

Another boundary map may be designed for two VR systems in the location 114 for a VR training seminar. For example, the boundary map may create an area for both VR systems to interact together in the location 114. Another boundary map may be designed for three VR systems in the location 114, and so forth.

In other words, a total VR-usable area of the location 114 may be subdivided into sections. The sections can then be allocated to different VR systems 106 and 110 as they enter or leave the location 114. The subdivisions can be computed on demand so that information about each VR system 106 and 110, the particular VR application being executed, and the like, can be taken into account when allotting space for the VR boundary map. Thus, all possible subdivisions may not need to be created during an initialization process. Rather, in one example, some subdivision parameters may be provided to the server 102 and the server 102 may generate the sub divisions of the location 114 for the VR boundary maps 104 on demand.

The VR boundary maps 104 for the location 114 may be generated during an initialization process and transmitted to the VR boundary server 102 for storage. The VR boundary maps for other locations may be similarly generated using the VR system 106 or another computing system. The VR boundary maps 104 stored in the server 102 may be stored in an agnostic format. In other words, the VR boundary maps 104 may be stored in a generic format that can be transmitted to the VR systems 106 and 110 and modified into a format that is compatible with an operating system of the VR system 106 or 110.

In another example, the VR boundary maps 104 may be stored in a variety of different formats compatible with different operating systems of different VR systems 106 and 110. Thus, the VR boundary map 104 may be transmitted to the VR system 106 and/or 110 in a format that is already converted into a format compatible with the VR system 106 and/or 110.

Figure 2:
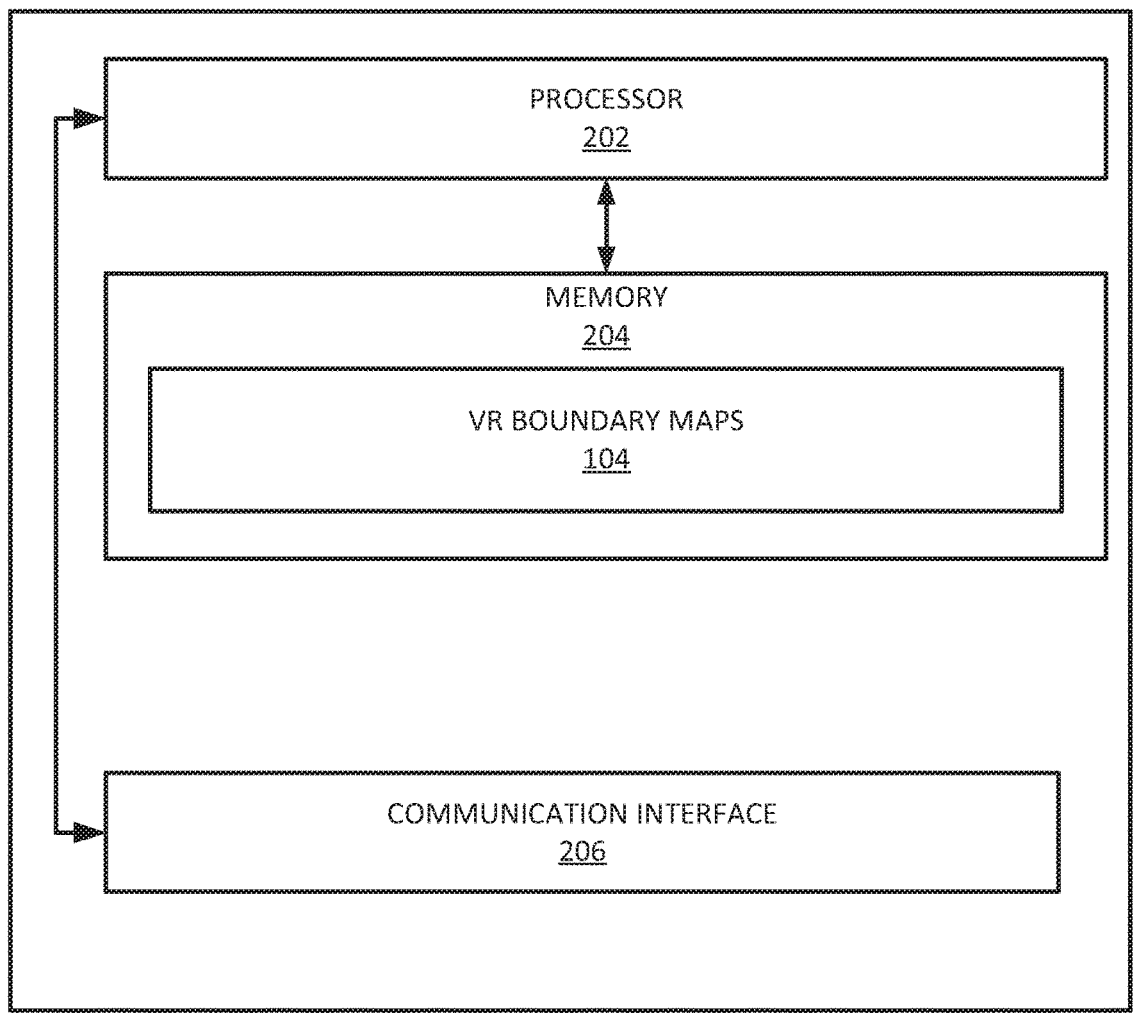
FIG. 2 is a block diagram of an example of a server in the virtual reality boundary map generation and sharing system of the present disclosure.

FIG. 2 illustrates an example of the VR boundary map server 102. The server 102 may include a processor 202, a memory 204, and a communication interface 206. The processor 202 may be communicatively coupled to the memory 204 and the communication interface 206. The processor 202 may execute instructions stored on the memory 204 to perform the functions described herein.

In one example, the memory 204 may be a non-transitory computer readable storage medium. The memory 204 may be a hard disk drive, a random access memory (RAM), a read only memory (ROM), and the like. The memory 204 may store the VR boundary maps 104. As discussed above, the VR boundary maps 104 may be different VR boundary maps for different locations, different numbers of VR systems in a location, a different application, or any combination thereof.

In one example, the server 102 may include a conversion unit to convert the VR boundary maps 104 into a format associated with an operating system of a requesting VR system. Thus, the VR boundary map may be in a format that is compatible with the operating system of the requesting VR system. In another example, the VR boundary maps 104 may be stored in an agnostic format and the format of the VR boundary map may be converted by the receiving VR system.

The communication interface 206 may establish a wireless communication path to the VR systems 106 and/or 110. For example, the communication interface 206 may communicate over an Internet protocol (IP) network. The IP network may be a local area network (LAN) (e.g., the server 102 is located within the same local wireless network as the VR systems 106 and 110 in the location 114) or a wide area network (WAN) (e.g., the server 102 is located remotely in a different building or geographic location than the location 114 of the VR systems 106 and 110). Room identification information may be received from the VR system 106 or 110 to the server 102 via the wireless communication path established by the communication interface 206.

In one example, the processor 202 may receive room identification information from the VR system 106 or 110. Referring back to FIG. 1, the location 114 may have a room identification (ID) 116. The room ID 116 may be a code (e.g., a bar code, a quick response code, and the like) that identifies the location 114. For example, the VR system 110 may enter the location 114 and use the camera on the HMD 112 to scan or read the room ID 116. The room ID 116 can then be transmitted to the server 102 to provide the room identification information.

In another example, the HMD 112 may scan the location 114 using the camera. The room identification information may include dimensions of the room that are measured manually or by the camera, or other sensing devices, of the HMD 112, a shape of the room, unique features associated with the location 114 (e.g., a number of windows, landmarks, unique features of the location 114, placement of furniture, lighting elements, locations of the windows and doors, and the like) that are captured by the camera. The images may be transmitted to the server 102 to identify the location 114.

In one example, the VR system 106 may include a global positioning system (GPS) or other types of indoor positioning systems. Thus, the location 114 may be identified based on the GPS or using other signals to determine the location 114. For example, the indoor position systems may determine the location 114 based on sensory information collected by the VR system 106. The sensory information may include signals, such as signal strength of nearby devices (e.g., a wireless router, WiFi signal strength, Bluetooth signal strength, and the like), radio waves, magnetic fields (e.g., using magnetic positioning based on metal inside of the location 114), acoustic signals, and the like. The GPS location or location information calculated by the indoor positioning system may then be transmitted to the server 102 to identify the location 114.

Referring back to FIG. 2, the processor 202 may compare the room identification information to a plurality of different rooms having VR boundary maps 104 stored in the memory 204 to identify the room. For example, an office building may have boundary maps generated for each one of hundreds of different rooms in the building. The processor 202 may identify which room out of the hundreds of rooms in the building that the VR system 110 has entered based on the room identification information.

The processor 202 may then identify the VR boundary map associated with the location. In one example, the VR boundary maps 104 may be stored in an indexed database. For example, the VR boundary maps 104 may be stored as a list that is indexed based on a room number, a name of the rooms, and the like. The processor 202 may then transmit the VR boundary map identified from the VR boundary maps 104 to the VR system 110. The HMD 112 of the VR system 110 may then display the transmitted VR boundary map.

In one example, the VR system 110 may transmit application information along with the room identification information. As noted above, the VR boundary map may also be identified based on the application that is being executed by the VR system 110. As discussed in further details below, the application that is being executed by the VR system 110 may determine an amount of "play space" for the VR boundary map. For example, for an application that is viewing an object, the user may be allocated more space in the VR boundary map to move around the object and to view the object. For an application that is a demonstration or training the user may be allocated less space in the VR boundary map as the user can stand still to watch the demonstration.

In one example, the server 102 may also include an occupancy tracking component. The occupancy tracking component may track a number of VR systems that are active in a particular location. For example, the VR system 110 may enter the location 114 and request a VR boundary map, as described above. The occupancy tracking component may increment a VR system counter for the location 114 to one.

At a later time, the VR system 106 may enter the room and request a boundary map from the server 102, as described above. The occupancy tracking component may increment the VR system counter for the location 114 to two. The server 102 may then automatically select the VR boundary map for two VR systems in the location 114 for the requested application.

In addition, the server 102 may automatically update the VR boundary map for the VR system 110 that was already in the location 114. In other words, the VR boundary map that is displayed in the HMD 112 may be automatically changed from the one VR system boundary map to the two VR system boundary map for the location 114. The VR boundary map may be changed without any request from the VR system 110.

At a later time, the VR system 106 may deactivate or leave the location 114. The server 102 may periodically ping the VR systems 106 and 110 to determine whether the VR systems 106 and 110 are still active and/or in the location 114. The server 102 may determine that the VR system 106 has deactivated or left the location 114. The server 102 may again automatically change the VR boundary map displayed on the HMD 112 of the VR system 110 to a one VR system boundary map for the location 114. Thus, the VR boundary maps may be dynamically changed as the number of active VR systems in the location 114 change. In other words, the server 102 may automatically detect a number of active VR systems in the location 114 and transmit the correct boundary map to the VR systems.

Figure 3:
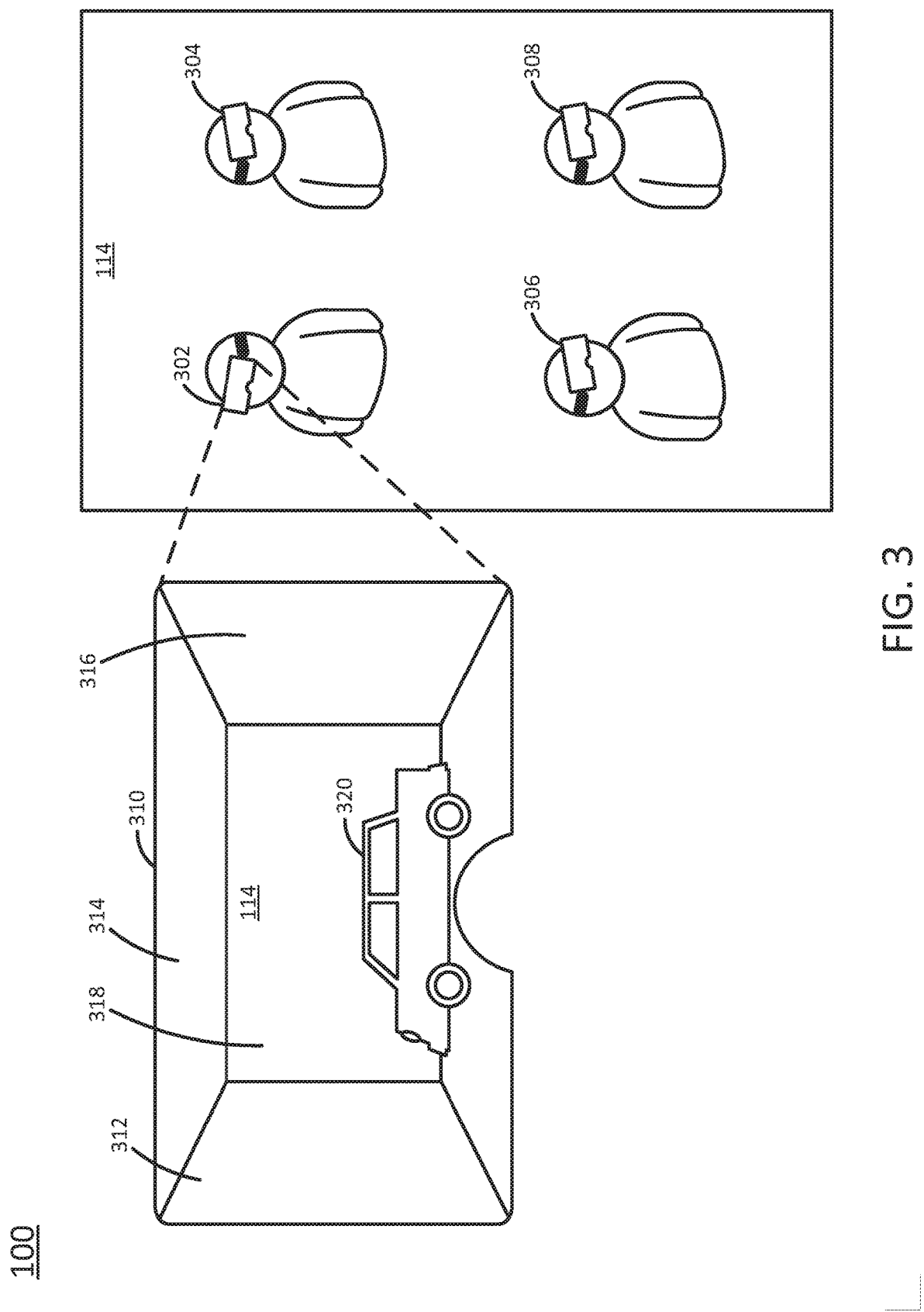
FIG. 3 is a block diagram of an example boundary map shown on a display of a head mounted display in a room that is boundary mapped of the present disclosure.

FIG. 3 illustrates an example boundary map 310 of display shown on an HMD in a location 114 that is boundary mapped. FIG. 3 illustrates the location 114. Notably, the location 114 may be a room with no interior walls or physical boundaries. However, in other examples, the location 114 may have physical boundaries, columns, and the like, that may be accounted for in the VR boundary maps 104. In one example, a first user with an HMD 302 may enter the location 114. The VR system associated with the HMD 302 may send room identification information to the server 102 and an application associated with the VR system (e.g., viewing an object), as discussed above.

The server 102 may determine the appropriate VR boundary map for a single VR system in the location 114 for the application of viewing an object. The VR boundary map may be transmitted to the VR system associated with the HMD 302. An example of a VR boundary map 310 may be displayed in the HMD 302 as illustrated in FIG. 3. In one example, an object 320 may be viewed in an example application. The VR boundary map 310 may display virtual walls 312, 314, 316, and 318. An additional virtual wall may be located behind the user (not shown in the current view of the HMD 302 illustrated in FIG. 3). The virtual walls 312, 314, 316, and 318 may provide the virtual boundary to prevent the user from running into other objects, furniture, physical structures, and the like in the location 114 while the user is walking around and viewing the object 320 (e.g., a car).

At a later time, a second VR system associated with the HMD 304 may enter the location 114. The second VR system may check in with the server 102 by providing room identification information and the application being executed to the server 102 to receive a VR boundary map. The server 102 may track the number of VR systems and identify the appropriate VR boundary map for two VR systems in the location 114 for the applications associated with each VR system. A new VR boundary map 310 may be transmitted to and displayed by the HMDs 302 and 304. For example, the dimensions of the virtual walls 312, 314, 316, and 318 displayed by the HMD 302 may become smaller as the area of the location 114 is subdivided for two VR systems.

In one example, when the VR system associated with the HMD 304 enters the location 114, a request to reduce the size of the VR boundary map 310 may be displayed on the HMD 302. If the user of the HMD 302 confirms the reduction in size of the VR boundary map 310, the server 102 may then update the VR boundary map 310 displayed by the HMD 302 and the VR boundary map displayed by the HMD 304. In one example, the HMD 302 may be paused as the new VR boundary map is transmitted and displayed in the HMD 302 while the user of the HMD 304 is joining the location 114.

In one example, if the user of the HMD 302 denies the request, or no request is received (e.g., the VR system of the HMD 302 loses its network connection), then the request for the VR boundary map by the VR system of the HMD 304 may be denied. For example, the server 102 may prevent the VR system of the HMD 304 from joining the location 114 as a safe play area cannot be provided to the HMD 304.

In one example, additional VR systems and HMDs 306 and 308 may enter the location 114. The server may track the active VR systems in the location 114 at four. Thus, the VR boundary maps displayed by the HMD 302, 304, 306, and 308 may be for four people in the location for the desired applications executed by the VR systems.

In one example, the VR system and HMD 308 may want to leave the location 114. The VR system of the HMD 308 may check out with the server 102. For example, the VR system of the HMD 308 may send a signal to indicate that the VR system of the HMD 308 is deactivating or leaving the location. In response, the server 102 may update the count of active VR systems in the location 114 to three and automatically update the VR boundary maps for the HMDS 302, 304, and 306 that remain in the location 114.

In one example, the server 102 may periodically ping the VR systems of the HMDs 302, 304, 306, and 308, as discussed above. Thus, if the VR system of the HMD 308 does not properly check out, the server 102 may still determine if the VR system of the HMD 308 has left when no response to the ping signal is received.

In one example, the VR system of the HMD 306 may want to change applications that may use a different sized VR boundary map. The server 102 may then notify the VR systems of the HMDs 302 and 304 to determine if the users accept the change. If the change is accepted, the VR system of the HMD 306 may be allowed to change applications and the new VR boundary maps may be transmitted from the server 102 to the VR systems of the HMDs 302, 304, and 306 that remain in the location 114.

Figure 4:
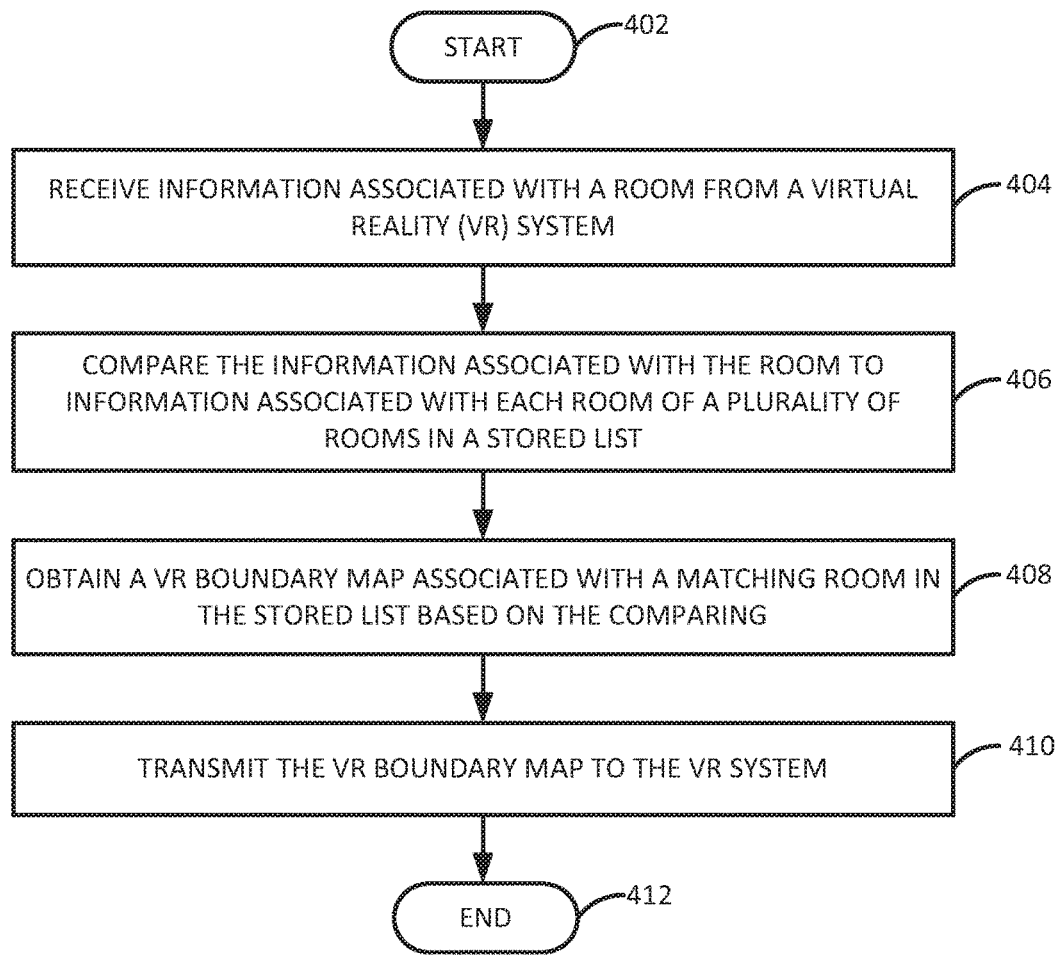
FIG. 4 is a flow chart of an example method for generating and sharing a virtual reality boundary map of the present disclosure.

FIG. 4 illustrates a flow diagram of an example method 400 for generating and sharing a virtual reality boundary map. In an example, the method 400 may be performed by the server 102 or the apparatus 500 illustrated in FIG. 5 and described below.

At block 402, the method 400 begins. At block 404, the method 400 receives information associated with a room from a virtual reality (VR) system. For example, the information associated with the room may be from a tag or code scanned in the room (e.g., a bar code, a quick response code, and the like). In another example, images of the room may be received. The images may be analyzed to determine the size of the room, the shape of the room, unique features of the room, and the like. Based on the analysis of the images, the information associated with the room may be obtained.

At block 406, the method 400 compares the information associated with the room to information associated with each room of a plurality of rooms in a stored list. For example, the tag or code may provide a room number or a room name. In another example, the analysis of the images of the room may be used to identify the room number or room name.

At block 408, the method 400 obtains a VR boundary map associated with a matching room in the stored list based on the comparing. In one example, a list of VR boundary maps may be stored. The VR boundary maps may be stored during an initialization process. Each room may be associated with more than one VR boundary map based on the number of VR systems in the room, the type of application being executed by the VR system, and the like.

In one example, the VR boundary map may be obtained by detecting a number of VR systems in the room. For example, a server that stores the VR boundary maps may track a number of active VR systems in the room. The boundary map may be selected based on the number of active VR systems in the room.

In one example, the VR boundary map may be dynamically changed as the number of VR systems in the room changes. For example, the VR boundary map may be changed as VR systems enter or leave the room. The VR boundary map may be obtained by detecting that a number of VR systems in the room has changed to a new number of VR systems. For example, a new VR system may check into the room to request a VR boundary map. The VR boundary map associated with the number of VR systems in the room may be obtained and transmitted to the VR systems.

At block 410, the method 400 transmits the VR boundary map to the VR system. In one example, the VR boundary map may be stored in an agnostic format. Thus, the VR boundary map may be transmitted to a VR system executing any type of operating system. The VR system may then locally convert the agnostic format of the VR boundary map into a format that is compatible with the operating system of the VR system.

In another example, the server may convert the VR boundary map into a format that is compatible with the operating system of the VR system before the VR boundary map is transmitted. For example, the server may know what type of operating system is being executed by the VR system. The server may convert the VR boundary map into the appropriate format compatible with the operating system before the VR boundary map is transmitted. At block 412, the method 400 ends.

Figure 5:
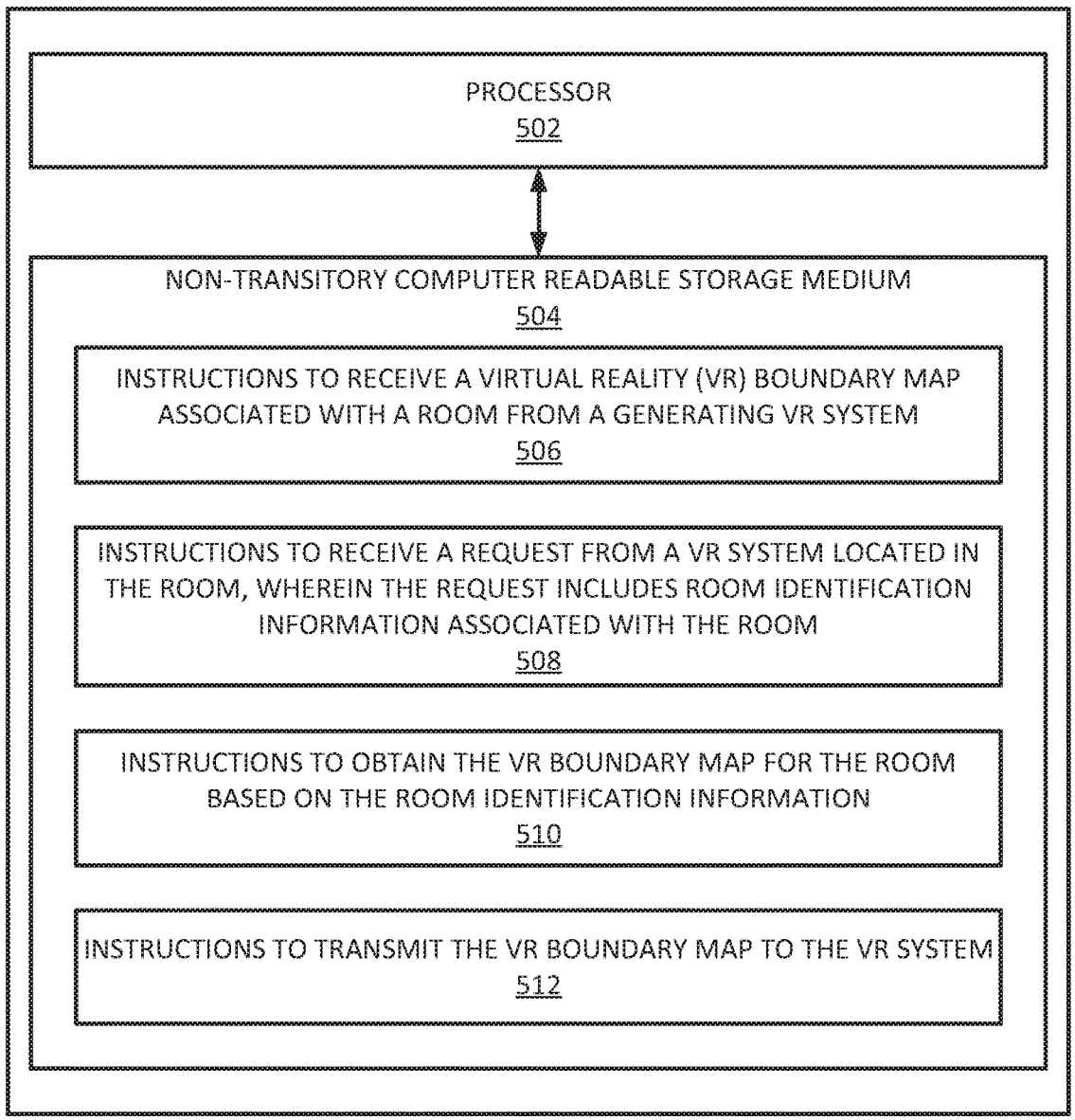
FIG. 5 is a block diagram of an example non-transitory computer readable storage medium storing instructions executed by a processor to generate and share a virtual reality boundary map of the present disclosure.

FIG. 5 illustrates an example of an apparatus 500. In one example, the apparatus 500 may be the server 102. In one example, the apparatus 500 may include a processor 502 and a non-transitory computer readable storage medium 504. The non-transitory computer readable storage medium 504 may include instructions 506, 508, 510, and 512 that, when executed by the processor 502, cause the processor 502 to perform various functions to generate and share a VR boundary map.

In one example, the instructions 506 may include instructions to receive a virtual reality (VR) boundary map associated with a room from a generating VR system. The instructions 508 may include instructions to receive a request from a VR system located in the room, wherein the request includes room identification information associated with the room. The instructions 510 may include instructions to obtain the VR boundary map for the room based on the room identification information. The instructions 512 may include instructions to transmit the VR boundary map to the VR system.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. A server, comprising:
   a communication interface to establish a communication session with a virtual reality (VR) system to receive room identification information;
   a memory to store a plurality of VR boundary maps for a plurality of different rooms, wherein each room of the plurality of different rooms has different VR boundary maps with different dimensions based on a number of active VR systems in the each room and an application being executed by each active VR system;
   a processor communicatively coupled to the communication interface and the memory, the processor to compare the room identification information to the plurality of different rooms stored in the memory to identify a first room of the plurality of different rooms, identify a VR boundary map from the plurality of VR boundary maps associated with the first room based on the application being executed and the number of active VR systems in the first room, and transmit the VR boundary map to the VR system via the communication session.

2. The server of claim 1, further comprising:
   an occupancy tracking component to track the number of active VR systems in the each room.

3. The server of claim 1, wherein the VR boundary map is to generate virtual walls that are displayed in a head mounted display of the VR system.

4. The server of claim 1, wherein the room identification information comprises dimensions of the first room, a unique feature of the first room, or data read from a bar code in the first room.

5. The server of claim 1, further comprising:
   a conversion unit to convert the VR boundary map from an agnostic format into a format associated the VR system.

6. A method, comprising:
   receiving, by a processor, information associated with a first room from a virtual reality (VR) system;

comparing, by the processor, the information associated with the first room to information associated with each room of a plurality of rooms in a stored list;

obtaining, by the processor, a VR boundary map associated with a matching room in the stored list based on the comparing, wherein each room of the plurality of rooms has different VR boundary maps with different dimensions based on a number of active VR systems in the each room and an application being executed by each active VR system; and transmitting, by the processor, the VR boundary map based on the application being executed and the number of active VR systems in the first room to the VR system.

7. The method of claim 6, wherein the obtaining, comprises:

detecting, by the processor, the number of active VR systems in the first room;

obtaining, by the processor, the VR boundary map for the first room that is associated with the number of active VR systems; and transmitting, by the processor, the VR boundary map to the VR systems.

8. The method of claim 7, wherein the obtaining, comprises:

detecting, by the processor, the number of active VR systems in the first room has changed to a new number of active VR systems;

obtaining, by the processor, the VR boundary map for the first room that is associated with the new number of active VR systems; and transmitting, by the processor, the VR boundary map to the VR systems.

9. The method of claim 6, wherein the VR boundary map is transmitted in an agnostic format to allow the VR system to convert the VR boundary into a native format associated with the VR system.

10. The method of claim 6, wherein the transmitting, comprises:

converting, by the processor, the VR boundary map from an agnostic format into a format associated with the operating system of the VR system before the transmitting.

11. A non-transitory machine-readable storage medium encoded with instructions executable by a processor, the machine-readable storage medium comprising:

instructions to receive a virtual reality (VR) boundary map associated with a first room from a generating VR system, wherein each room of a plurality of rooms has different VR boundary maps with different dimensions based on a number of active VR systems in the each room and an application being executed by each active VR system;

instructions to receive a request from a VR system located in the first room, wherein the request includes room identification information associated with the first room;

instructions to obtain the VR boundary map for the first room based on the room identification information, the application being executed, and the number of active VR systems in the first room; and instructions to transmit the VR boundary map to the VR system.

12. The non-transitory machine-readable storage medium of claim 11, wherein the VR boundary provides virtual walls that limit a play space of the VR system to an area that is less than an entire area of the first room.

* * * * *